US005326967A

United States Patent [19]

Herrmann et al.

[11] Patent Number: 5,326,967

[45] Date of Patent: Jul. 5, 1994

[54] APPARATUS FOR MONITORING THE CLOSING OF A WINDOW BY AN ELECTRIC MOTOR, PARTICULARLY A WINDOW OF A MOTOR VEHICLE

[75] Inventors: Rolf Herrmann; Gregor Aussendorf, both of Lippstadt, Fed. Rep. of Germany

[73] Assignee: Hella KG Hueck & Co., Lippstadt, Fed. Rep. of Germany

[21] Appl. No.: 19,834

[22] Filed: Feb. 19, 1993

[30] Foreign Application Priority Data

Feb. 21, 1992 [DE] Fed. Rep. of Germany ....... 4205251

[51] Int. Cl.⁵ ............................................. G01V 9/04

[52] U.S. Cl. ................................. 250/221; 250/222.1

[58] Field of Search ............................ 250/221, 222.1; 340/540, 541, 555, 556, 557, 545

[56] References Cited

U.S. PATENT DOCUMENTS 3,623,057 11/1971 Hedin ................................ 340/557
3,792,260 1/1974 Stewart et al. ...................... 250/221
5,023,444 6/1991 Ohman ............................... 250/221
5,063,288 11/1991 Hsu et al. ........................... 250/221

FOREIGN PATENT DOCUMENTS

0011744A1 6/1980 European Pat. Off. .
2459677A1 6/1975 Fed. Rep. of Germany .......... E05F 15/20
2821681 11/1979 Fed. Rep. of Germany .
3107847C2 2/1982 Fed. Rep. of Germany .......... E05F 15/20
3137003A1 3/1983 Fed. Rep. of Germany ... B60J 1/17
8710940 12/1987 Fed. Rep. of Germany .......... E05F 15/20
3700617A1 7/1988 Fed. Rep. of Germany ... F16P 3/14
3740326A1 6/1989 Fed. Rep. of Germany .......... E05F 15/20
4028584A1 11/1991 Fed. Rep. of Germany ... F16P 3/14
4030607A1 4/1992 Fed. Rep. of Germany .......... G01S 13/00
2524984 10/1983 France .
PCT/GB90/-01549 5/1991 PCT Int'l Appl. .

*Primary Examiner*—David C. Nelms
*Assistant Examiner*—Stephone B. Allen
*Attorney, Agent, or Firm*—Griffin, Butler, Whisenhunt & Kurtossy

[57] ABSTRACT

An apparatus for monitoring the closing of a window by an electric motor, particularly a window pane of a motor vehicle, has a sender and a receiver for electromagnetic transmissions and at least one light-deflecting mechanism which guides electro-magnetic emissions, or waves, from the sender to the receiver. The apparatus can be used in conjunction with devices for stopping or reversing motion of the window pane if during the closing thereof the transmission intensity received at the receiver changes, the light-deflecting mechanism being arranged along at least portions of an upper edge of a window opening.

20 Claims, 1 Drawing Sheet

APPARATUS FOR MONITORING THE CLOSING OF A WINDOW BY AN ELECTRIC MOTOR, PARTICULARLY A WINDOW OF A MOTOR VEHICLE

BACKGROUND OF THE INVENTION

This invention relates to an apparatus for monitoring a closing process of a window pane, particularly a motor vehicle window pane, of a type having a sender and a receiver for electro-magnetic transmissions, having at least one light-deflecting mechanism which aids in transmitting electro-magnetic emissions from the sender to the receiver and with which operation of the window pane stops or is reversed if a transmission intensity received at the receiver changes during the closing process.

Such apparatus are known from the prior art and are used to prevent jamming or squeezing of body members or objects during the closing of a window that is driven by an electric motor.

In German patent document DE-PS 31 07 847, for example, an apparatus is suggested having a light conductor mounted along a closing, or upper, edge of a window frame which conducts light rays from a sender to a receiver. If the light conductor, which is constructed as a lightconducting fiber bundle, is squeezed, because, for example, an object is jammed between the window and the window frame, a change in the light intensity occurs at the receiver, thereby causing the motion of the window to stop or be reversed.

In another embodiment described in DE 31 07 847, the light conductor is constructed as a squeezable, plastic tube having a reflective coating on the inside.

Both embodiments have the disadvantage that manufacturing a monitoring apparatus of the described type requires a relatively cost-intensive and complicated light conductor.

It is even more disadvantageous that the light conductor has to be deformed for the monitoring apparatus to respond so that a response occurs only after an object or a body part has already been squeezed with a certain pressure.

Although a squeezing or jamming pressure required for activation of the monitoring apparatus is not very high, it causes an unpleasant sensation. A fright, or panic, reaction may also be possible. Squeezing may even result in injury, if, for example, body parts of children are involved.

It is an object of the invention to provide a monitoring apparatus which is particularly uncomplicated and cost-effectively constructed and which provides an influencing of a window drive without jamming or squeezing something.

SUMMARY

According to principles of this invention, a light-deflecting mechanism, or measure, is arranged along at least portions of the upper edge of a window opening.

The light-deflecting mechanism can be a light-refracting or a light-reflecting device.

Light-refracting devices can be, for example, prism and/or lens arrangements which guide electro-magnetic transmissions from a sender to a receiver.

Reflecting devices can be appropriately constructed to have plane or concave reflection surfaces by means of which electro-magnetic transmissions are guided through single or multiple reflections from a sender to a receiver.

In this regard, it is possible in one particularly uncomplicated manner, for example, by means of a light barrier arrangement comprised of an infrared sender and an infrared receiver, to monitor the entire upper edge area of a window opening. That is, the infrared light is guided along the upper edge area of the window opening to the receiver via an open (non-enclosed) light-deflecting device or surface. If during the closing process of the window an object or a body part reaches into this area, reduced transmission intensity is received by the receiver, which thereby causes motion of the window pane to stop or be reversed by means of control electronics.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF A PREFERRED EMBODIMENT

The drawings depict two embodiments of the monitoring apparatus for this invention.

Figure 1:
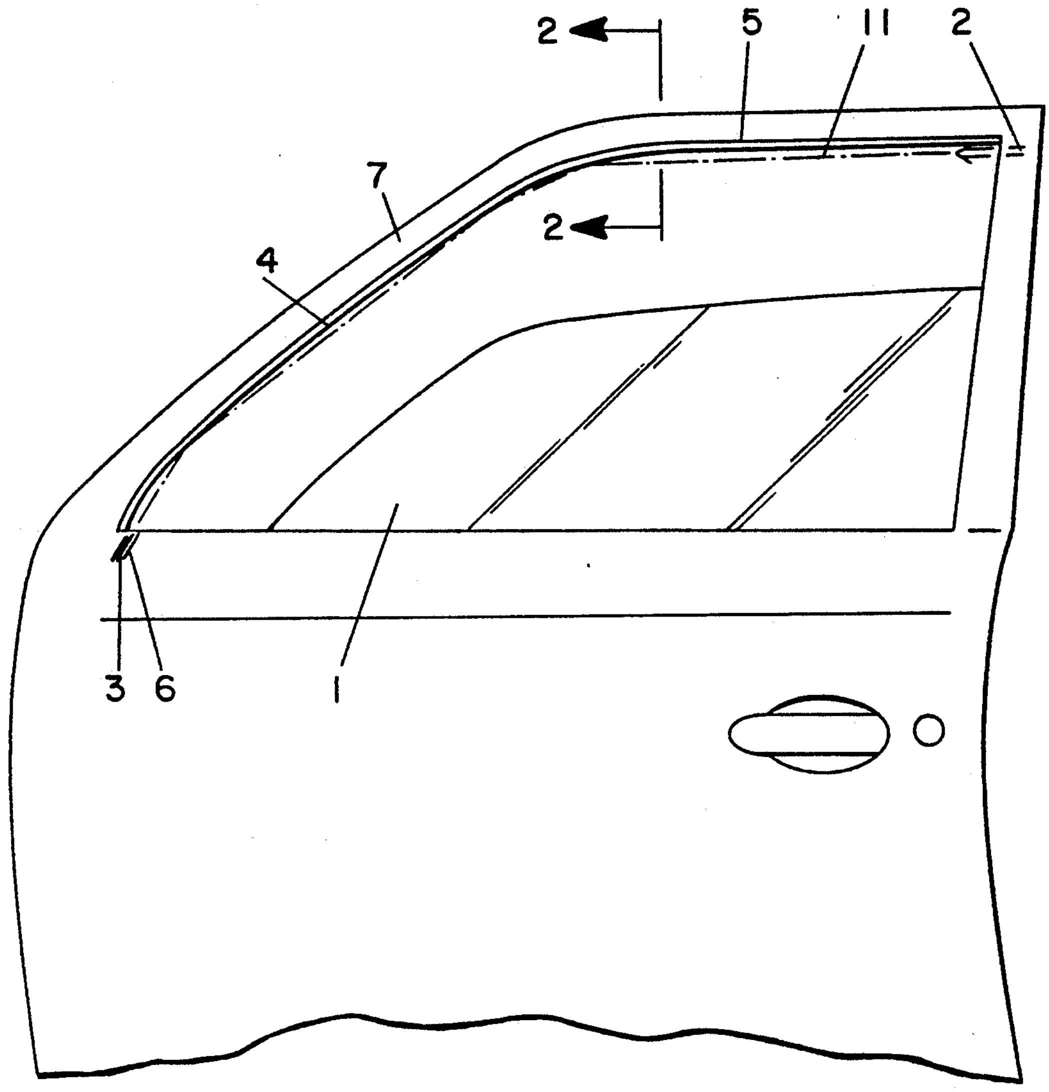
FIG. 1 is a schematic side view of the monitoring apparatus of this invention.

FIG. 1 depicts a side view from outside of a motor vehicle door having a window pane 1 driven by an electric motor and a monitoring apparatus of this invention.

In the area of an upper edge of a window opening 5 a reflecting device 4 is applied to an inside surface at the door in a manner to be described.

An infrared transmission sender 2 and an infrared transmission receiver 3 are arranged at the door or fitting into a door frame at opposite sides, or ends, of the upper edge area of the window opening.

At least a portion of a transmission intensity emitted by the sender 2 is received by the receiver 3 via a simple or multiple reflection(s). FIG. 1 shows a possible transmission path as an example.

Figure 2:
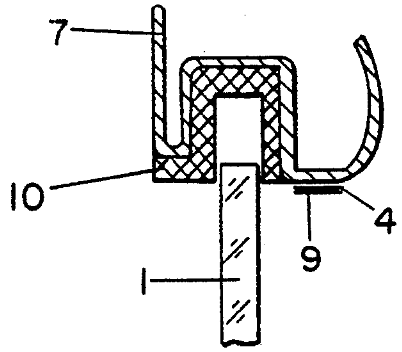
FIGS. 2 and 3 respectively depict two cross-sectional side views of different embodiments taken on line A—A of FIG. 1.
Figure 3:
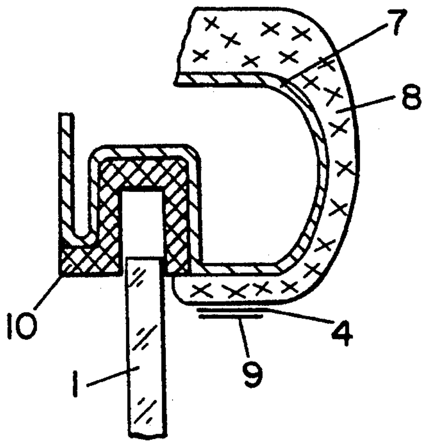

FIGS. 2 and 3 depict cross-sections of an area on line A—A of FIG. 1. Reference numerals for similar elements or elements with similar functions correspond to the numerals of FIG. 1.

FIG. 2 is a cross-sectional view of an upper door spar. A rubber seal 10 is fitted into the upper door spar 7 into which the window pane 1, which is driven by the motor, fits during the closing process.

A plane, open, or non-enclosed, surface area of the upper door spar 7 is made as a reflecting device 4.

That is, a surface of door spar metal was polished for achieving reflecting characteristics thereon. It is beneficial to provide this area of the door spar 7 with a protective coating 9. In this regard, an infrared-permeable protective lacquer or infrared-permeable foil can be used, for example.

The door spar 7 can also be provided with a reflecting lacquer coating, instead of polishing the area of the door spar 7, which is designed to serve as the reflecting device 4. Polished metal foils or sheet metal which are mounted, or applied, in this area of the door spar 7 can also be used as the reflecting device 4. The shape of the applied metal foil or sheet metal can easily predetermine the transmission path from the sender 2 to the receiver 3.

FIG. 3 shows another embodiment of the monitoring apparatus of this invention. In this embodiment, the upper door spar 7 has an inner door lining 8 inside the motor vehicle. In this regard, the reflecting means 4 is made to be a reflecting surface of the inner door lining 8. The reflecting surface which is applied to an appropriate area of the inner door lining 8 can also be a reflecting coating of lacquer or a polished metal foil or sheet metal. It is a particular benefit of this embodiment that predetermination of the light path can be achieved prior to mounting the inner door lining 8 on the door spar 7 by shaping the inner door lining 8, for example. Mounting and calibrating the reflecting device 4 can thus be achieved in a beneficial manner independently of the mounting of the door frame.

The reflecting surface 4 applied to the inner door lining 8 is coated also in this embodiment with a suitable protective layer (such as an infrared-permeable plastic foil or an infrared-permeable protective lacquer or something similar).

In FIG. 1, an example of a transmission path 11 of light guided from the sender 2 to the receiver 3 is depicted in a very simplified manner. Actually, several transmission paths, dependent particularly upon the shape of the reflecting device 4, are possible, especially by means of multiple reflections. Thus, it is beneficial to arrange the receiver 3 and coupled electronics such that they do not react only to non-transmissions, but even to transmissions of a reduced light intensity, thereby allowing an influencing of the window drive even upon interruption of any possible light path.

On the other hand, it is also possible to use in this monitoring only that portion of transmitted light which is transmitted directly (that is, by means of a simple reflection) from the sender 2 to the receiver 3. Thus, application of the reflecting device 4 can be limited to a small portion of the upper edge of the window opening 5.

While the invention has been particularly shown and described with reference to a preferred embodiment, it will be understood by those of ordinary skill in the art that various changes in form and detail may be made therein without departing from the spirit and scope of the invention.

It is noted that where a door frame does not extend above a window opening the apparatus of this invention could be mounted on a body frame forming the window opening.

Other, undescribed elements of monitoring apparatus, for example control circuits or mechanical portions of window drives are well-known, thus it is not thought necessary to describe them here. It is, however, suggested here that it would be beneficial for the sender 2 to be driven by pulses and the receiver 3 to be supplied with a tube for preventing interference by uniform, or atmosphere, light or scattered light, thus further increasing sensitivity of the apparatus.

An arrangement of this invention is particularly beneficial in that no light-conducting medium is used whose light-conducting characteristics are altered by outside influence as in the case, for example, of a light-conducting fiber bundle or in a compressible tube or hose which has a reflective surface on its interior.

With this invention, an object or a body part in danger of being jammed can also be detected without being jammed first. In addition, this arrangement is particularly uncomplicated and cost-effective, because only one sender and one receiver are required despite a curved transmission path. Also, the light-deflecting mechanism, or measure, can be constructed without undue effort.

If a window frame contour is to be monitored which has a complicated shape or is particularly large, several senders and several receivers can form several light barrier arrangements.

A particularly cost-effective arrangement can be achieved by having one sender send to several receivers or one receiver receive from several senders, the single element being arranged at an appropriate, centrally located position between multiple elements of the other type.

It is also beneficial to arrange a reflecting device, for example a mirror, such that a sender and receiver can be arranged in close proximity.

It is particularly beneficial regarding construction, mounting and wiring of such an embodiment, if a sender and a receiver can be arranged in one housing. Of course, arrangements comprising several senders and/or receivers are also possible.

The embodiment in which an area at the underside of an upper door spar can be made to be reflecting, for example by polishing its surface and coating it with a reflecting lacquer, has the particular advantage of low material costs.

The other described embodiment which utilizes as a reflecting device a strip of metal foil or sheet metal applied to the underside of the upper door spar has the advantage that no particular demands as to the shape of the door spar need be made and that the shape must not be manipulated later, because a predetermination of the light path is achieved by shaping the applied reflecting device; for example, by slightly bending the sheet metal strip to allow it to act as a reflecting device.

Similarly, it is an advantage for the reflecting device to be made part of an inner door lining. Also, in this case, the reflection direction can be predetermined in an uncomplicated manner by shaping the inner door lining without requiring changes to the door frame.

In all of these embodiments, it is beneficial to protect the surface which is acting as a reflecting device against, for example, scratches by a protective layer, or coating. This protective coating can be, for example, a dark infrared-permeable plastic foil or an infrared-permeable coat of lacquer.

Such protective layers can also achieve an improved aesthetic effect of the reflecting device, particularly if the reflecting device is made as a shining-polished metal surface.

The embodiments of the invention in which an exclusive property or privilege are claimed are defined as follows:

1. A monitoring apparatus for monitoring the closing of a window, particularly of a motor vehicle window, having a sender and a receiver for electro-magnetic transmissions, at least one deflecting means for deflecting light which aids in transmitting electro-magnetic emissions from said sender to said receiver, wherein said means for deflecting light is arranged along at least a non-linear portion of an upper edge area of a window opening, for deflecting light along a path in said window opening substantially corresponding in shape to a shape of said non-linear portion and being positioned close to said non-linear portion, whereby said apparatus can be used in a system for causing operation of said window to stop or be reversed if an object is placed at said non-linear portion to thereby cause a transmission intensity change t the receiver during a closing process.

2. A monitoring device as in claim 1 wherein said deflecting means includes a light-refractor, particularly in a shape and form of a prism or lens.

3. A monitoring apparatus as in claim 1 wherein said deflecting means includes a reflector.

4. A monitoring apparatus as in claim 3 wherein a frame defining said window opening defines a reflecting surface.

5. A monitoring apparatus as in claim 4 wherein said reflector defines a concave reflection surface.

6. A monitoring apparatus as in claim 3 wherein a portion of an upper door spar defining said window opening includes said reflector.

7. A monitoring apparatus as in claim 3 wherein said reflector is sheet metal.

8. A monitoring apparatus as in claim 3 wherein said reflector is a reflecting coating.

9. A monitoring apparatus as in claim 1 wherein a protective layer is applied to said light-deflecting means, said protective layer being a transmission permeable coating.

10. A monitoring apparatus as in claim 1 wherein are further included at least one sender and several receivers for electromagnetic transmissions.

11. A monitoring apparatus as in claim 1 wherein said sender and said receiver are arranged in one housing.

12. A monitoring apparatus as in claim 1 wherein said sender and said receiver include means for sending and receiving pulsed, infrared light forming said electromagnetic transmissions.

13. A monitoring apparatus as in claim 1 wherein said receiver includes a tube for shielding out environmental light.

14. A monitoring apparatus as in claim 4 wherein said reflector defines a plane reflection surface.

15. A monitoring apparatus as in claim 3 wherein a portion of an inner door lining defining said window opening includes said reflector extending along said window opening.

16. A monitoring apparatus as in claim 3 wherein said reflector is applied to an inner door lining defining said window opening.

17. A monitoring apparatus as in claim 7 wherein said reflector sheet metal is a metal foil.

18. A monitoring apparatus as in claim 1 wherein said means for deflecting light defines a portion of said window opening at said non-linear portion.

19. A monitoring apparatus as in claim 18 wherein said means for deflecting is a reflector which partially defines said window opening.

20. A monitoring apparatus as in claim 1 wherein said means for deflecting extends along said non-linear portion and includes a non-linear reflecting surface.

* * * * *